United States Patent
Mohanty et al.

(10) Patent No.: US 10,414,880 B2
(45) Date of Patent: Sep. 17, 2019

(54) RENEWABLE REPLACEMENTS FOR CARBON BLACK IN COMPOSITES AND METHODS OF MAKING AND USING THEREOF

(71) Applicant: University of Guelph, Guelph (CA)

(72) Inventors: Amar Mohanty, Guelph (CA); Manjusri Misra, Guelph (CA); Atul Bali, Markham (CA); Arturo Rodriguez-Uribe, Guelph (CA)

(73) Assignee: UNIVERSITY OF GUELPH, Guelph (CA)

( * ) Notice: Subject to any disclaimer, the term of this patent is extended or adjusted under 35 U.S.C. 154(b) by 0 days.

(21) Appl. No.: 15/126,187

(22) PCT Filed: Mar. 13, 2015

(86) PCT No.: PCT/CA2015/050189
§ 371 (c)(1),
(2) Date: Sep. 14, 2016

(87) PCT Pub. No.: WO2015/135080
PCT Pub. Date: Sep. 17, 2015

(65) Prior Publication Data
US 2017/0107334 A1    Apr. 20, 2017

Related U.S. Application Data

(60) Provisional application No. 61/952,964, filed on Mar. 14, 2014.

(51) Int. Cl.
| | | |
|---|---|---|
| *C08J 3/22* | (2006.01) | |
| *C08L 27/06* | (2006.01) | |
| *C08L 23/12* | (2006.01) | |
| *C08K 3/04* | (2006.01) | |
| *B09B 3/00* | (2006.01) | |
| *C08L 101/00* | (2006.01) | |
| *C08L 23/06* | (2006.01) | |

(52) U.S. Cl.
CPC ............... *C08J 3/226* (2013.01); *B09B 3/00* (2013.01); *B09B 3/0083* (2013.01); *C08K 3/04* (2013.01); *C08L 23/06* (2013.01); *C08L 23/12* (2013.01); *C08L 27/06* (2013.01); *C08L 101/00* (2013.01); *C08J 2323/06* (2013.01); *C08J 2323/12* (2013.01); *C08J 2327/06* (2013.01); *C08J 2400/16* (2013.01); *C08J 2423/06* (2013.01); *C08J 2423/12* (2013.01); *C08J 2427/06* (2013.01); *C08L 2310/00* (2013.01); *Y02W 30/20* (2015.05)

(58) Field of Classification Search
CPC .... C08J 3/226; C08J 3/22; C08K 3/34; C08K 3/04; C08L 23/12; C08L 27/06; C08L 23/06
USPC .......................................................... 524/502
See application file for complete search history.

(56) References Cited

U.S. PATENT DOCUMENTS

| | | | | |
|---|---|---|---|---|
| 2003/0024165 A1* | 2/2003 | Antal, Jr. | ................. | C10B 1/04 48/209 |
| 2007/0287795 A1* | 12/2007 | Huda | ..................... | C08L 97/02 524/703 |
| 2013/0023409 A1* | 1/2013 | De Leij | .................... | B01J 20/20 502/420 |
| 2016/0229997 A1* | 8/2016 | Mohanty | ................ | C08L 23/12 |

FOREIGN PATENT DOCUMENTS

| | | | |
|---|---|---|---|
| CA | 2865902 A1 | | 9/2013 |
| WO | WO 2012/007949 | * | 1/2012 |
| WO | WO 2012/139355 | * | 10/2012 |

OTHER PUBLICATIONS

PCT/CA2015/050189 International Search Report and Written Opinion dated Jul. 14, 2015.

* cited by examiner

*Primary Examiner* — Deve E Valdez
(74) *Attorney, Agent, or Firm* — Eduardo Krupnik

(57) ABSTRACT

Biocarbon is presented as an alternative to synthetic carbon black. Master batches having biocarbon for usage in raw plastics and/or the production of composites. Biocarbon is mainly derived from plant biomass, but other sources can be used. A method of producing the master batch: (a) pyrolyzing processed biomass in an oxygen-starved environment to produced biocarbon; (b) comminuting the biocarbon in a reduced oxygen atmosphere; (c) cooling the comminuted biocarbon; (d) mixing the cooled comminuted biocarbon with a carrier resin, thereby producing the master batch.

25 Claims, 4 Drawing Sheets

| Standard Name | L* | a* | b* | C* | h° | | | |
|---|---|---|---|---|---|---|---|---|
| Carbon Black N762 2wt% | 27.23 | 0.12 | 0.37 | 0.39 | 72.63 | | | |

| Trial Name | DL* | Da* | Db* | DC* | DH* | DEcmc | P/F DEcmc | DE* |
|---|---|---|---|---|---|---|---|---|
| 0-300 Micron Biocarbon 2wt% | 0.06 Lighter | 0.02 | -0.05 Bluer | -0.04 Duller | -0.03 Redder | 0.09 | Passed | 0.08 |
| 1-300 Micron Biocarbon 4wt% | 0.02 Lighter | 0.04 Redder | -0.05 Bluer | -0.03 Duller | -0.06 Redder | 0.11 | Passed | 0.07 |
| 2-300 Micron Biocarbon 4wt% (Eng in MBa) | 0.19 Lighter | 0.05 Redder | -0.04 Bluer | -0.02 Duller | -0.06 Redder | 0.16 | Passed | 0.20 |
| 3-20 Micron Biocarbon 2wt% | -2.58 Darker | -0.00 | -0.08 Bluer | -0.07 Duller | -0.02 Redder | 1.72 | Failed | 2.58 |
| 4-20 Micron Biocarbon 4wt% | -2.13 Darker | -0.01 | -0.20 Bluer | -0.19 Duller | -0.08 Redder | 1.44 | Failed | 2.14 |

| Standard Name | L* | a* | b* | C* | h° | | | |
|---|---|---|---|---|---|---|---|---|
| Carbon Black N762 4wt% | 26.44 | 0.11 | 0.40 | 0.41 | 74.53 | | | |

| Trial Name | DL* | Da* | Db* | DC* | DH* | DEcmc | P/F DEcmc | DE* |
|---|---|---|---|---|---|---|---|---|
| 0-20 Micron Biocarbon 4wt% | -0.42 Darker | 0.01 | -0.25 Bluer | -0.22 Duller | -0.11 Redder | 0.47 | Passed | 0.48 |
| 1-20 Micron Biocarbon 2wt% | -0.28 Darker | -0.00 | -0.25 Bluer | -0.23 Duller | -0.10 Redder | 0.42 | Passed | 0.37 |
| 2-300 Micron Biocarbon 4wt% (Eng in MBa) | 0.73 Lighter | 0.07 Redder | -0.02 | 0.01 | -0.07 Redder | 0.50 | Passed | 0.73 |
| 3-300 Micron Biocarbon 4wt% | 0.64 Lighter | 0.03 Redder | -0.09 Bluer | -0.07 Duller | -0.06 Redder | 0.45 | Passed | 0.65 |
| 4-300 Micron Biocarbon 2wt% | 1.03 Lighter | 0.02 Redder | -0.07 Bluer | -0.06 Duller | -0.04 Redder | 0.70 | Passed | 1.03 |

FIG. 4

RENEWABLE REPLACEMENTS FOR CARBON BLACK IN COMPOSITES AND METHODS OF MAKING AND USING THEREOF

CROSS REFERENCE TO RELATED APPLICATIONS

This application claims priority of U.S. Provisional Ser. No. 61/952,964, filed Mar. 14, 2014, the contents of which are hereby incorporated by reference into the present disclosure.

FIELD OF THE INVENTION

The present invention relates in general to the field of additives for plastics and/or composites. In particular, the present invention relates to plant derived elemental carbon as an additive for plastics and/or composites.

BACKGROUND OF THE INVENTION

Plastics and/or rubbers and composites typically require the use of additives and/or fillers to prepare viable commercially useful materials. Additives and/or fillers are essential for their processing and have a direct impact on the cost-performance of the final product. Specific and desired aesthetic and/or color can also be targeted through the use of these materials.

Fillers are particulate additives used for a variety of purposes to modify the performance of plastics. Carbon black is widely used in considerable quantities as reinforcing filler in the rubber industry. However, when it is used in, for example commodity plastics, the quantities based on total weight percentage do not normally exceed 4% due to a loss in the mechanical properties of the doped plastic. Carbon black in plastics, for example for high density polyethylene piping or polyolefins for automotive applications does not typically exceed these percentages. In automotive parts' applications, carbon black is used as pigment and as an ultraviolet absorber in a variety of plastics including, but not limited to polypropylene (PP); polyethylene (PE); thermoplastic polyolefin (TPO) (rubberized polyolefin); or their blend; and poly (vinyl chloride) (PVC).

World-wide production of commodity carbon black in 2011 was 14.26 million tones and is expected to grow 5% from 2013-2018. Carbon black is derived from non-renewable resources such as natural gas or petroleum-derived heavy oils through a chemical-thermal conversion. The soot formed in this process is recovered and processed into carbon black. The most common process today is the "furnace black process". In this process each kilogram of carbon black requires approximately two and a half kilograms of oil. The fossil-fuel carbon black industry is a major contributor to carbon dioxide emissions, which has been implicated in global warming.

Although elemental carbon in carbon black occurs at nanometer scale, aggregate states may occur at the micron scale. In addition, carbon black is produced as fine dust which represents a serious environmental and health risk and hazard if manipulated in this form. A common solution to this problem is to pelletize the carbon black in the presence of binding agents into agglomerates or 'pearls' or to produce master batches of carbon black prior to final dosage in plastics. However, those familiar with the technology of using "pearls" of carbon black master batch pellets are aware of the challenges that the plastic industry faces to disperse these carbon blacks during the final dosage for extrusion or injection molded pieces.

The ASTM standard D3350 Section 2 points out that the concentration of carbon black "in carbon-doped" plastics should be higher than 2% by weight in order to provide an adequate UV protection. However, as previously stated, it is known by those versed in this art that the use of carbon black should not exceed 4 wt % (more preferably 3% and even more preferably 2.5 wt %) of the total composition in the case of plastics such as polyolefins, PVC, or similar thermoplastics used for pipes and/or automotive applications. When carbon black is added in excess, it generally reduces the general mechanical properties of the plastics.

SUMMARY OF THE INVENTION

The present invention relates to a use of renewable carbon sources as an alternative to carbon black. Preferably, the biocarbon is produced from plant biomass. Biomass is produced by plants through photosynthesis in a process that absorbs atmospheric carbon dioxide in a cyclic process.

The particle size of biocarbon can be manipulated at various micron and sub-micron scales depending on the industrial needs. The biocarbon can be produced at temperatures ranging from about 400° C. up to about 900° C. Temperatures ranging from 450° C. to around 700° C. can produce materials with a high degree of chemical functionalization, which in such case could be called reactive filler.

The present invention is directed to biocarbon-based master batches and to, methods of manufacturing biocarbon master batches and a system to convert biocarbon in situ into said biocarbon master batches. The master batch of the present invention, in one embodiment, may be free or devoid of non-renewable carbon.

In the embodiments of the present invention, composites including one or more synthetic plastics, such as one or more thermoplastics, and one or more biocarbon, as a replacement for carbon black, are described. This disclosure also includes the description of an industrial device designed to produce biocarbon and the respective master batch in a continuous process. Thus, biocarbon is manipulated through master batches.

As such, in one embodiment, the present invention is a master batch for the production of composites, the master batch comprising a blend of elemental carbon and a carrier resin.

In one embodiment, the master batch of the present invention includes from about 25% wt. to about 75% wt. of elemental carbon and from about 25% wt. to about 75% wt. of the carrier resin.

In another embodiment of the present invention, the elemental carbon is derived from pyrolized biomass.

In one embodiment of the master batch of the present invention, the biomass is selected from: plant fibers, municipal solid waste, agricultural biomass, forest biomass, and animal manure.

In one embodiment of the master batch of the present invention, the carrier resin is a synthetic polymer.

In one embodiment of the master batch of the present invention, the synthetic polymer is selected from polyethylene (PE), crosslinked-polyethylene (PEX), polypropylene (PP), impact polypropylene, and polybutylene (PB); polyvinylchloride (PVC), chlorinated polyvinyl chloride (CPVC), polyvinylidene fluoride (PVDF), polystyrene (PS), acrylic polymers, nylon, acrylonitrile butadiene styrene, thermoplastic polyurethanes, polycarbonates, or combinations thereof.

In one embodiment of the master batch of the present invention, the carrier resin is a bioplastic.

In one embodiment of the master batch of the present invention, the bioplastic is selected from poly(lactic acid) (PLA), polyglycolic acid (PGA), poly(lactic acid-co-glycolic acid (PLGA), polycaprolactone, polyhydroxyalkanoates or combinations thereof.

In one embodiment of the master batch of the present invention, the blend further comprises an additive.

In one embodiment of the master batch of the present invention, the blend comprises from about 1% wt. to about 10% wt. of the additive.

In one embodiment of the master batch of the present invention, the additive is selected from glycidyl methacrylate terpolymers, vinyl acrylate, ester methacrylate, anhydride, peroxide, functionalized polymers, functionalized glycidyl methacrylate copolymers of ethylene methyl methacrylate, talc, calcium carbonate, clay and organic fillers.

In another embodiment, the present invention is a composite including a polymer compounded with a master batch of any of the previous embodiments.

In one embodiment of the composite of the present invention, the composite includes between 1% wt. and 6% wt. of the elemental carbon.

In another embodiment, the present invention provides for a product including the composite of any of the previous embodiments.

In another embodiment, the present invention provides for a method of producing a master batch. In one embodiment, the method includes: (a) pyrolyzing processed biomass in an oxygen-starved environment to produced biocarbon; (b) comminuting the biocarbon; and (c) mixing the comminuted biocarbon with a carrier resin, thereby producing the master batch.

In one embodiment of the method of producing a master batch of the present invention, the pyrolysis is carried out at a temperature of about 400° C. to about 900° C.

In one embodiment of the method of producing a master batch of the present invention, the biocarbon is comminuted while it is at about 350° C.

In one embodiment of the method of producing a master batch of the present invention, the comminuting of step (b) takes place in a reduced oxygen atmosphere.

In one embodiment of the method of producing a master batch of the present invention, the method further comprises cooling the comminuted biocarbon.

In one embodiment of the method of producing a master batch of the present invention, the comminuted biocarbon is cooled to about 200° C.

In one embodiment of the method of producing a master batch of the present invention, the biocarbon is comminuted to a particle size ranging from about 100 microns to about 50 nanometers.

In one embodiment of the method of producing a master batch of the present invention, from about 25% wt. to about 70% wt of the carrier resin is mixed with from about 30% wt. to about 75% wt. of the biocarbon.

In one embodiment of the method of producing a master batch of the present invention, the method further comprises adding an additive.

BRIEF DESCRIPTION OF THE DRAWINGS

The following figures illustrate various aspects and preferred and alternative embodiments of the invention.

FIG. 4. Color features of biocarbon samples of the present invention using carbon black as a control standard. "D*" defines the color difference between the known carbon black standard and different biocarbon samples of the present invention: $DL^*$=difference in lightness/darkness value+=lighter-=darker; $Da^*$=difference on red/green axis+=redder-=greener; $Db^*$=difference on yellow/blue axis+=yellower-=bluer; $DC^*$=difference in chroma+=brighter-=duller; $DH^*$=difference in hue; and $DE^*$=total color difference value.

DESCRIPTION OF THE INVENTION

I—Definitions

Figure 1:
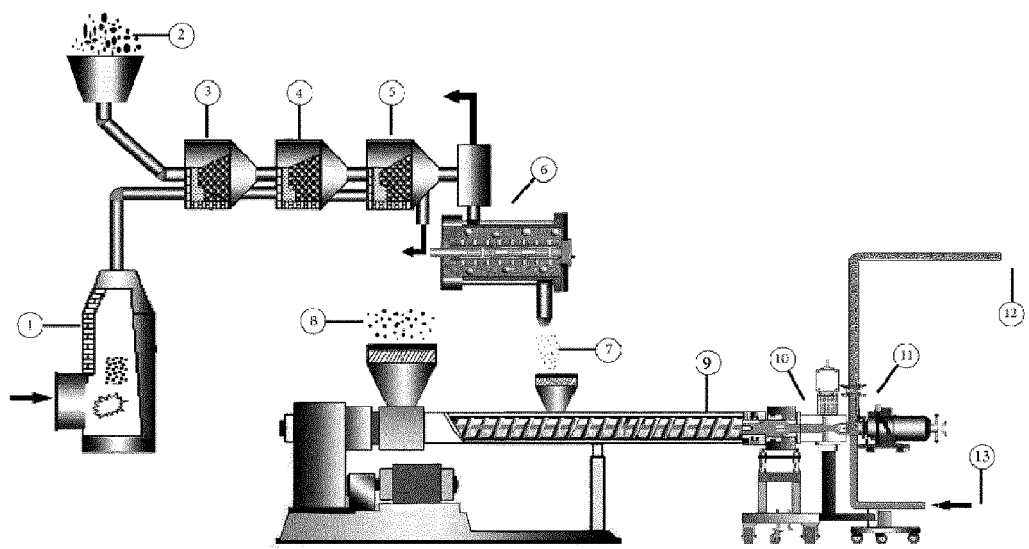
FIG. 1. is a schematic for a device and/or process for the preparation of master batches in accordance to one embodiment of the present invention.

Unless defined otherwise, all technical and scientific terms used herein have the same meaning as commonly understood by one of ordinary skill in the art to which this invention belongs. Also, unless indicated otherwise, except within the claims, the use of "or" includes "and" and vice versa. Non-limiting terms are not to be considered limiting unless expressly stated or the context clearly indicates otherwise (for example "including", "having" and "comprising" typically indicate "including without limitation"). Singular forms including in the claims such as "a", "an" and "the" include the plural reference unless expressly stated otherwise. In order to aid in the understanding and preparation of the within invention, the following illustrative, non-limiting, examples are provided.

"Additives and fillers" have many objectives when used in plastics. They can be used as reinforcements, impact modifiers, lubricants, heat stabilizers, light stabilizers, pigments, flame retardants, antioxidants, etc. "Plant derived elemental carbon" or "elemental carbon", or "Biocarbon" as used herein, refers to the material obtained from the pyrolysis of treated or modified (for example, by chopping or grinding) biomass, such as plant fibers, agricultural/forest biomass, municipal solid waste (MSW), and/or animal/bird manures, etc. The pyrolysis is typically performed at about 400° C. and up to about 900° C. in low oxygen.

"Biochar", as used herein, refers to the material obtained from the pyrolysis of biomass, such as plant fibers, agricultural/forest biomass, municipal solid waste (MSVV), and/or animal/bird manures, etc. The pyrolysis is typically performed, that is the biomass is carbonized, in an oxygen-starved environment above about 475° C.

"Biocarbon master batch", as used herein, refers to master batch having a relative high concentration of one or more biocarbon (e.g. about 25% to 75%)—and one or more polymers and could also include one or more additives such as, but not limited to, impact modifier, dispersing agent, processing agent, lubricants, etc.

"Carbon black" as used herein, refers to the material produced from petroleum-based (non-renewable) natural resources—natural gas, oil, etc.—and produced mainly either by "oil furnace process/black", or "acetylene" processes.

"Carbon black master batch" as used herein, refers to master batch having a relative high concentration of carbon black (e.g. about 25% to 75%)—and one or more polymers and could also include one or more additives like, but not limited to, impact modifier, dispersing agent, processing agent, lubricants, etc.

"Natural material", as used herein, refers to materials derived from a natural source such as plants or trees which can be further modified through industrial processes, such as grinding or chopping.

"Synthetic plastic", as used herein, refers to a plastic prepared, at least in part, by human intervention, i.e., semi-synthetically or synthetically. This also includes recycled synthetic plastics.

"Thermoplastic", as used herein, refers to a material, such as a polymer, which softens (e.g., becomes moldable or pliable) when heated and hardens when cooled.

"Bio-plastic" as used herein, refers to materials that are essentially derived from biomass and/or biobased.

"Composite", as used herein, generally means a combination of two or more distinct materials, each of which retains its own distinctive properties in order to create a new material with properties that cannot be achieved by any of the components individually.

"Master batch", as used herein, refers to a mixture or blend composed mainly by two fractions: a carrier resin and an additive to be dispersed. Master batch is typically prepared by extrusion and obtained in form of pellets. The concentration of additive to carrier resin in the master batch can vary, for example, 25 wt % to 75 wt % additive to 25 wt % to 75 wt % of carrier resin. The master batch is used to control the dosage and dispersion when added in the desired ratio during extrusion or injection molding of the final composite materials.

"Carrier resin" refers to plastics used for the production of the master batch. They present important properties such as the melt flow and molecular weight that impact directly in the processing of the master batch.

"Melt flow index" or "MFI", as used herein, refers to the measure of the ease of flow of the melt of a thermoplastic polymer or composite. It is defined as the mass of polymer or composite, in grams, flowing in ten minutes through a capillary of a specific diameter and length by a pressure applied via prescribed alternative gravimetric weights for alternative prescribed temperatures. The method is described in the similar standards ASTM D1238 and ISO 1133.

"Mechanical properties", "thermal properties", and "flammability", as used herein, refer to the specifications of ASTM D-638, ASTM D-790-10 and ISO 178, ASTM D1822, ASTM D648, ASTM D792, and ASTM D625-10.

The term "wt. %" refers to the weight percent of a component in the composite formulation with respect to the weight of the whole composite formulation.

II—Master Batch

The biocarbon master batch of the present invention may be prepared by blending biocarbon with one or more synthetic plastics and/or bioplastics, and optionally one or more additives. The additives may be introduced as a component of the biocarbon master batch or can be added during the molding of a final piece or product. The biocarbon master batch may include one or more synthetic plastics and/or bioplastics and one or more sources of biocarbon. In the explanatory embodiments of this disclosure, although not limited to these values, the concentration of biocarbon in the biocarbon master batch may range from about 25 wt % to about 75 wt % and any ranges there in between, such as from about 25 wt % to about 65 wt %, and from about 40 wt % to about 50 wt %. Included in this disclosure as herein explained in more detail, a method and a new device to produce in situ the biocarbon and biocarbon master batch in a continuous process is described.

A. Production/Processing of Biocarbon and Biocarbon Master Batches

Biocarbon may be produced from one or more biomass sources like energy crops, such as *miscanthus* and switchgrass, other plant/tree fibers, agricultural/forest biomass, municipal solid waste (MSW), and/or animal/bird manures, and other coproducts and waste streams of agricultural products including but not limited to dried distillers grains, coffee chaff, spent tea leaves, spent coffee grinds, etc. Different sources of biocarbon produced by plants may present different chemical and physical properties such as ash content, carbon content, morphology, surface chemistry, etc. Also such different sources can produce different effects on the final properties of the composite or material. Table 1 shows a comparative carbon content between large and small screen size of *miscanthus* biocarbon. Carbon content was measured using a Phenom Pro X (PhenomWorld, Netherlands) unit. Energy dispersive spectroscopy (EDS) analysis was used to investigate the surface carbon content of the biocarbon.

Carbon content can vary due to the milling and sieving process. This is demonstrated in Table 1 below. Varying carbon may positively influence in different ways the properties and functionality of the materials.

TABLE 1

| Elemental analysis of carbon | |
| --- | --- |
|  | Carbon content (% dry) |
| *Miscanthus* biocarbon 300 micron screen size | ~70 |
| *Miscanthus* biocarbon 20 micron screen size | >90 |

The concentration of biocarbon derived from the biomass in the biocarbon master batch of the present invention may present variations from about 25 wt % to about 75 wt % and any range there in between, such as from about 40 wt % to about 70 wt %, from about 40 wt % to about 65 wt %, from about 40 wt % to about 60 wt %, from about 40 wt % to about 50 wt % and so forth. The particle size of the biocarbon may influence the performance/properties of the final composite. The particle size of the biocarbon may range from the micro to sub-micron, and can be modified, for example by milling and/or sieving.

Small particle sizes can be obtained by using different milling/sieving devices. The device shown in FIG. 1 eliminates the need of this "external" milling-processing steps.

B. Synthetic Plastics/Bioplastics

The biocarbon master batch described herein may also include one or more synthetic plastics and/or bioplastics. In the embodiments shown herein, the production of the biocarbon master batch is exemplified with the so called thermoplastics.

Exemplary thermoplastics include, but are not limited to, polyolefin, such as polyethylene (PE), cross-linked-polyethylene (PEX), polypropylene (PP), impact polypropylene, polybutylene (PB); polyvinylchloride (PVC), chlorinated polyvinyl chloride (CPVC), polyvinylidene fluoride (PVDF), polystyrene (PS), acrylic polymers, nylon, acrylonitrile butadiene styrene (ABS), poly(butylene succinate) (PBS), poly(butylene succinate) adipate (PBSA), thermoplastic polyurethanes, polycarbonates, or combinations thereof.

In particular embodiments, the synthetic plastic has a melting point or processing window from about 100° C. to about 200° C., such as about 130° C. to about 190° C. The exemplary embodiments show the use the synthetic plastic such as polyethylene, polypropylene, such as high impact polypropylene, or polyvinyl chloride.

Suitable bioplastics include, but are not limited to, polyhydroxy acids, such as poly(lactic acid) (PLA), polyglycolic acid (PGA), poly(lactic acid-co-glycolic acid (PLGA), polycaprolactone, polyhydroxyalkanoates, such as poly-3-hydroxybutyrate (PHB), poly(3-hydroxyvalerate), poly(4-hydroxybutyrate) and copolymers thereof.

The concentration of the synthetic plastics and/or bioplastics in the master batch depends on the concentration of carbon as well as additives. However, typical loads vary from about 25 wt % to about 65 wt %.

C. Master Batch Additives

These include but are not limited to impact modifiers, compatibilizers, viscosity/flow modifiers, etc. and their concentrations in the biocarbon master batch could vary from about 1% to about 10%.

Exemplary additives include, but are not limited to, glycidyl methacrylate terpolymers, vinyl acrylate as functional groups, ester methacrylate as functional groups, anhydride as functional groups, peroxide, etc., functionalized polymers, such as reactive maleic anhydride polyolefins, and functionalized glycidyl methacrylate copolymers of ethylene methyl methacrylate and dispersing agents including but not limited to polyacrylates, etc. Inorganic fillers, such as talc, calcium carbonate, and/or clay and organic fillers may also be used.

III—Methods of Manufacturing

A. Master Batch

Master batches can be prepared using a variety of techniques. In some embodiments, the master batches are prepared by extrusion processing (e.g., twin or single extruders). A master batch can be processed either by two feeders or by pre-mixing both and fed at the same time in one feeder. The processing temperatures may vary accordingly to the melting point of the plastics, but in general carbonaceous materials are stable at temperatures of about 200° C. or higher.

In some explanatory embodiments, biocarbon is produced in situ and immediately fed into an extruder with polymeric carrier resin to form the biocarbon master batch. A schematic of such a process/device is shown in FIG. 1. With reference to FIG. 1, the unit includes a furnace (1), a pre-heater (3), a reformer (4), a pyrolyser (5) and ball bill grinder (6) to convert biomass (2) introduced in the unit to produce the biocarbon for direct outlet drop (7) into the extruder (9), where it is mixed with carrier resin (8). The combined resin passes through the die plate (10) and is cut in the cutting chamber (11) under water (13) to produce biocarbon master batch (12).

With continued reference to FIG. 1, in one embodiment of the present invention, the method may start by pyrolyzing biomass in an oxygen-starved environment. The temperature of the pyrolysis process can vary from about 400° C. to about 900° C. The pyrolyzed material (i.e. biocarbon) while it is at about 350° C. may be comminuted (6), for example ball milled, in a reduced oxygen atmosphere to micron/submicron size (e.g. about 50 nanometers to about 100 microns). The comminuted biocarbon may be cooled, for example by passing the comminuted biocarbon through a cooling cylinder, such as a water-jacketed cylinder, to reduce the temperature further (e.g., about 200° C.). The milled and cooled down biocarbon may be fed into an extruder (9) where it may be mixed with the carrier resin (8). The concentration of the resin may vary but is typically from about 25 wt % to about 75 wt % by weight of biocarbon master batch in order to produce the master batch (12). The coextruded master batch material may then be produced in pellets.

The process described above saves energy by using the biocarbon temperature to generate the compounding reaction with the carrier resin. Biocarbon is carbonized from biomass (as the input) at about 400° C. using slow pyrolysis. It can also be carbonized using fast pyrolysis (about 900° C.) and intermediate pyrolysis (about 700° C.) to optimize yields/ash content.

Biocarbon is highly flammable when exposed to oxygen in its high temperature state. Therefore, conventional production methods for making biocarbon include systems to cool it down by water spray as soon as the biocarbon comes out of the carbonizer. The system described thereof eliminates the need of wetting the biocarbon by using a water jacket to cool it before or after ball milling or grinding (depending on fast or slow or intermediate pyrolysis) to about 200° C. and feeding the biocarbon directly into the extruder, the heat of the exothermic reaction can be used to melt carrier resin and extrude more efficiently. Furthermore, immediate reaction with the carrier resin also minimizes or eliminates the flammability of the biocarbon and reduces the energy consumption in the process, as the energy of the exothermic reaction of the heated biocarbon in the extrusion process is utilized.

Biocarbon is also very hygroscopic when exposed to air. During storage these materials may be, and are most of the times, moistened due to the inherent fire risks. Therefore, it has to be dried again after storing in order to be used for the purposes here described. Therefore, the invention described in this section removes the need for an additional and costly drying step after storage.

IV—Advantages

The particle size of biocarbon can be manipulated from the micron to sub-micron scales by milling and sieving. Similarly, biocarbon can be agglomerated in the presence of agglutinants or can be processed into master batches for transporting and manipulation.

The plastic(s) in the biocarbon master batch may or may not be the same as the plastic(s) used for the final production of molded pieces. The use of the biocarbon master batch allows for a more homogeneous dispersion, and therefore, for a better preservation of the general properties of the plastics. In contrast, direct addition of carbonaceous materials into the plastic may result in a less uniform dispersion, and therefore, resulting in a deleterious process due to the need of a more exhaustive mixing. A direct dose of biocarbon into the plastic may also produce a poor dispersion of the particles which may create areas of concentrated stress which may lead to failure during working conditions of plastics. The composite can also contain one or more natural materials (e.g., hybrid composites) and/or one or more additives, such as reinforcing agents, compatibilizers, impact modifiers, heat stabilizers, fillers, etc. The embodiments herein cited also describe the use of particular additives called impact modifiers which influences the properties of the plastics reinforced with carbonaceous materials.

Biocarbon can be used to modify a variety of properties of the resulting plastics/composites based on particle size and/or final weight percent of the formulation, such as color; gloss; appearance; rigidity/modulus strength; impact strength; heat deflection temperature; moldability/melt flow index; and electrical conducting properties.

In the explanatory embodiments, injection molded samples pigmented through the use of biocarbon master batch have similar or even improved mechanical and/or physical properties compared to those manufactured from carbon black master batch, such as strength, impact strength, rigidity/modulus, heat deflection temperature, moldability/melt flow index, and density.

The specific examples below are to be construed as merely illustrative, and not limitative of the remainder of the invention in any way whatsoever. Without further elaboration, it is believed that one skilled in the art can, based on the description presented herein, utilize the present invention to the full extent. Any mechanism proposed below does not in any way restrict the scope of the claimed invention. Thus the scope of the invention should be determined by the appended claims and their legal equivalents, rather than by the examples given.

V—Examples

The examples are described for the purposes of illustration and are not intended to limit the scope of the invention.

A—Manufacture/Processing

Figure 2:
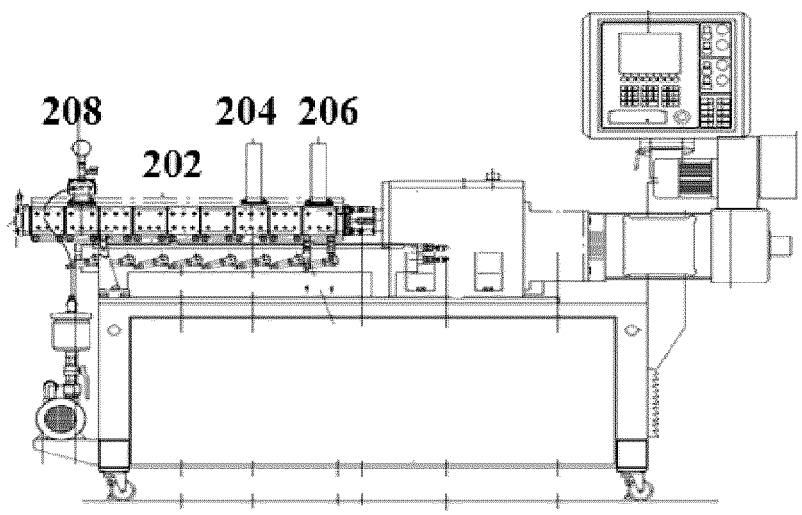
FIG. 2. is a schematic of a twin screw extruder used for processing thermoplastics.
Figure 3:
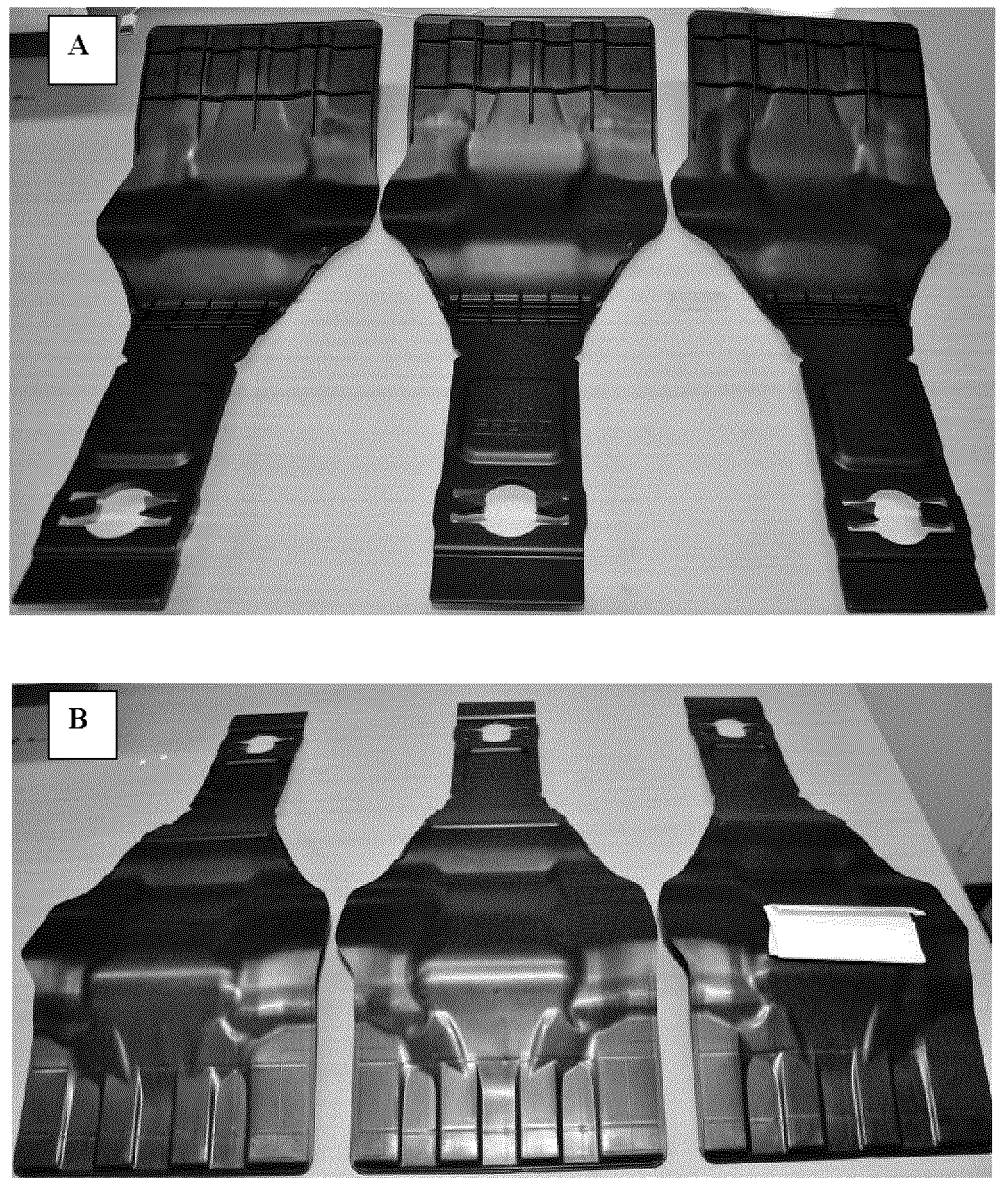
FIG. 3. Illustrate examples of final products. Panel A is the front view of spare tire covers. The left and center cover were prepared with bio-black/PP and the right cover was prepared from carbon black/PP. Panel B is the rear view of the covers panel A.

The master batches were manufactured by using either lab-scale instruments or industrial scale instruments. As explained herein, the schematic and working mechanisms of the industrial continuous production of biocarbon master batch is shown in FIG. 1. A schematic of a twin-screw extruder that can be used to prepare the master batches is shown in FIG. 2. The twin-screw unit 200 includes a main barrel 202, two feeders 204, 206, and a degassing pump 208. A master batch can be processed either by two feeders or by pre-mixing both and fed at the same time in one feeder. The processing temperatures may vary accordingly to the melting point of the plastics, but in general carbonaceous materials are stable at any processing temperatures at which most thermoplastics melt.

Upon mixing the biocarbon master batch with one or more plastics and/or bioplastics, the concentration of the biocarbon material is typically from about 1% to about 5% and ranges in between, from about 1% to about 4%, from about 2% to 3 wt % and so forth.

In order to assess the properties or the impact of biocarbon in the final composites, tensile and flexural bars as well as impact specimens, or other specimens were manufactured either by using micro-injection molding instruments (i.e., DSM Explore, Netherlands) or industrial injection molding instruments (i.e., injection molder Arburg ALLROUNDER, Germany, with a capacity of 77 tons). Injection molding techniques are familiar to those versed in the art of mechanical testing of materials and the standards used are described in herein definitions.

B—Examples
Example 1

The data of Table 2 shows that the properties of homopolymer polypropylene (Pinnacle Polymers PP1350N) doped with biocarbon are clearly superior compared to carbon black even with an appreciable difference in the particle size. The screen size of biocarbon used for these examples was 20 microns and the carbon content by Energy Dispersive Spectroscopy (EDS) was higher than 90% (>90%). The particle size distribution is relatively wide, but no larger than 20 micron. The particle size of the carbon black used was of 0.23 micron and the content of carbon was ~99% as specified by the technical data sheet (Asbury carbon black 5991). Both samples of carbon were powders and used to make master batches. The master batches were further used to deliver a final content of biocarbon or carbon black at two levels; this is 2 wt % and 4 wt %. The properties of the neat homopolymer polypropylene measured at the same conditions showed a tensile strength of 37 MPa, a tensile modulus of 2 GPa, an elongation at break of less than sf 20%, a density of 0.908 g/cm$^3$, and an Notched Izod impact of 25 J/m.

TABLE 2

| Properties | 1 | 2 | 3 | 4 | 5 | 6 | 7 | 8 |
|---|---|---|---|---|---|---|---|---|
| 2 wt % biocarbon (20 micron screen) in homopolymer polypropylene | 37 ± 10.1 | 2180 ± 30 | 180 ± 20 | 55 ± 1 | 1834 ± 45 | 25 ± 1 | 0.910 ± 0.001 | 57 ± 1 |
| 4 wt % biocarbon (20 micron screen) in homopolymer polypropylene | 37 ± 1 | 2260 ± 50 | 200 ± 50 | 56 ± 2 | 1807 ± 46 | 24 ± 2 | 0.916 ± 0.001 | 53 ± 1 |
| 2 wt % Carbon black in homopolymer polypropylene | 35 ± 0.5 | 2090 ± 60 | 50 ± 10 | 51 ± 1 | 1703 ± 40 | 23 ± 2 | 0.919 ± 0.001 | 57 ± 1 |
| 4 wt % Carbon black in homopolymer polypropylene | 34 ± 0.5 | 2120 ± 50 | 40 ± 10 | 49 ± 1 | 1530 ± 58 | 20 ± 2 | 0.925 ± 0.001 | 48 ± 1 |

Table 2 references:
"1" = Ten at yield (MPa),
"2" = Tensile Mod (MPa),
"3" = % Elongation at break,
"4" = Flexural Stress (MPa),
"5" = Flexural Modulus (MPa),
"6" = Notched Izod Impact Energy (J/m),
"7" = Density g/cm$^3$, and
"8" = MFI, g/10 min, (230° C./2.16 kg).

Example 2

The following examples in Table 3 illustrate and compare the properties of biocarbon from *miscanthus*sp produced at 450° C. to biocarbon produced at 950° C. The pyrolyzed material was milled after the pyrolysis and sieved with a 300 micron screen. The matrix is homopolymer polypropylene from Pinnacle Polymers 1350N. The overall properties of the plastic mostly improve with the use of biocarbon produced at 450° C., especially the tensile and elongation properties and can be compared even with those obtained for carbon black. The density is visibly reduced when biocarbon produced at 450° C. is used. Those versed in the art of manufacture of biocarbon by pyrolysis may realize that the ash content concentration increases with the increase in temperature. A practical consequence is that high quality carbon can be derived from biomass by using less than half of the energy used for the production of carbon black just for the pyrolysis of the raw materials.

Example 3

Data in Table 4 shows that the properties of polyethylene (DOW™ LDPE 9931) doped with biocarbon are similar or superior compared to carbon black even with an appreciable difference in the particle size. The particle size of biocarbon for these examples was of less than 20 micron and the carbon content higher than 90% (see example 1 for conditions for determining carbon content). The particle size of the carbon black used was of 0.23 micron and content of carbon of ~99% (Asbury carbon black 5991) (as per technical data sheet). Both samples of carbon were powders and used to make master batches. The master batches were further used to deliver a final content of carbon at two levels; this is 2 and 4 wt %. The properties of the neat polyethylene measured at the same conditions showed a tensile strength of 10 MPa, a tensile modulus of 300 MPa, an elongation at break of less than 40%, a density of 0.920 g/cm$^3$, and a notched Izod impact of 420 J/m.

TABLE 3

| Properties | 1 | 2 | 3 | 4 | 5 | 6 | 7 |
|---|---|---|---|---|---|---|---|
| 2 wt % of biocarbon (300 micron screen) In PP1350N (biocarbon produced at 450° C. | 34 ± 0.5 | 1890 ± 50 | 190 ± 30 | 53 ± 0.5 | 1700 ± 20 | 23 ± 1 | 0.910 ± 0.001 |
| 4 wt % of biocarbon (300 micron screen) In PP1350N (biocarbon produced at 450° C.) | 35 ± 1 | 2050 ± 50 | 20 ± 5 | 55 ± 2 | 1716 ± 40 | 23 ± 2 | 0.913 ± 0.001 |
| 3 wt % of biocarbon (300 micron screen) in PP1350N (biocarbon produced at 950° C.) | 32 ± 1 | 1920 ± 50 | 7 ± 1 | 54 ± 0.5 | 1700 ± 30 | 23 ± 1 | 0.920 ± 0.001 |

Table 3 references:

"1" = Ten at yield (MPa),

"2" = Tensile Mod (MPa),

"3" = % Elongation at break,

"4" = Flexural Stress (MPa),

"5" = Flexural Modulus (MPa),

"6" = Notched Izod Impact Energy (J/m),

"7" = Density g/cm$^3$.

TABLE 4

| Formulation | 1 | 2 | 3 | 4 | 5 | 6 | 7 | 8 |
|---|---|---|---|---|---|---|---|---|
| 2 wt % biocarbon (20 micron screen) in polyethylene | 11 ± 1 | 356 ± 25 | 70 ± 10 | 8 ± 1 | 215 ± 30 | 450 ± 50 | 0.921 ± 0.001 | 26 ± 1 |
| 4 wt % biocarbon (20 micron screen) in polyethylene | 12 ± 1 | 360 ± 20 | 50 ± 10 | 8 ± 1 | 220 ± 15 | 350 ± 100 | 0.925 ± 0.001 | 25 ± 1 |
| 2 wt % of Carbon black In polyethylene | 11 ± 0.2 | 337 ± 35 | 57 ± 15 | 8 ± 0.5 | 214 ± 1 | 450 ± 30 | 0.934 ± 0.001 | 24 ± 1 |
| 4 wt % of Carbon black in polyethylene | 12 ± 0.5 | 338 ± 30 | 49 ± 10 | 8 ± 0.5 | 220 ± 10 | 360 ± 40 | 0.945 ± 0.001 | 22 ± 1 |

Table 4 references:
"1" = Ten at yield (MPa),
"2" = Tensile Mod (MPa),
"3" = % Elongation at break,
"4" = Flexural Stress (MPa),
"5" = Flexural Modulus (MPa),
"6" = Notched Izod Impact Energy (J/m),
"7" = Density g/cm$^3$, and
"8" = MFI, g/10 min, (230° C./2.16 kg).

Example 4

A set of experiments with polyvinyl chloride (PVC) shows that biocarbon performs better in impact strength (Notched Izod impact). The increase in this property is of 100%. This is basically due to the moderately polar behavior of PVC which is likely to interact with the potential existing carbonyl groups or polar groups.

For this example, a master batch of milled biocarbon and polyvinyl chloride (PVC) in a ratio of 40 wt % biocarbon to 60 wt % PVC was manufactured. The PVC had a Mw (molecular weight) of about 62,000 and an Mn (number average molecular weight) of about 35,000. The PVC was plasticized with 10 wt % epoxidized soybean oil. A comparative master batch containing carbon black was also prepared. The master batches were used to dope neat PVC at a final concentration of 3% by weight. The properties of the final composites are shown in Table 5.

TABLE 5

|   | 3 wt % Biocarbon in PVC | 3 wt % Carbon Black in PVC |
|---|---|---|
| 1 | 63 ± 5 | 59 ± 6 |
| 2 | 2820 ± 304 | 2770 ± 320 |
| 3 | 7.6 ± 3 | 8.5 ± 1.3 |
| 4 | 103 ± 1.7 | 103 ± 0.5 |
| 5 | 3481 ± 63 | 3617 ± 65 |
| 6 | 30 ± 6 | 15 ± 0.5 |
| 7 | 1.340 ± 0.007 | 1.346 ± 0.001 |
| 8 | 38 ± 4 | 39 ± 4 |
| 9 | 57 | 57 |

Table 5 references:
"1" = Ten at yield (MPa),
"2" = Tensile Mod (MPa),
"3" = % Elongation at break,
"4" = Flexural Stress (MPa),
"5" = Flexural Modulus (MPa),
"6" = Notched Izod Impact Energy (J/m),
"7" = Density g/cm$^3$,
"8" = MFI, g/10 min, (190° C./21.6 kg), and
"9" heat deflection temperature (° C.).

Example 5

Samples manufactured with biocarbon are as black or blacker than carbon black. This test was performed in an X-Rite Spectrophotometer Ci6x model. In these tests and with respect to the standard the negative and positive DL values indicate that the sample is respectively "darker" or "lighter" and a similar criteria is used for red and blue tints as well as dull properties. For example, for information given for red, when the number is zero the materials does not contain any extra red or yellow tones. The tolerance was set at 1, but it has only the meaning to indicate how much the samples deviate from the standard.

In examples herein described, master batches containing 40% carbon black and 60% polyethylene were prepared, and were let down into polyethylene (PE DMDA 8965) to achieve different final concentrations of carbon black or biocarbon. Carbon black was used as reference at two different concentrations 2 and 4% by weight. Two different sources of carbon black were used: Raven 410 from Columbian Chemicals Company and carbon black Continex™ N762 from Continental Carbon with respectively 27 and 36 m/g$^2$ of surface area. These sources of carbon black were compared to biocarbon with a particle size of 20 micron at a two concentrations 2 and 4% by weight. Carbon black was also compared to 300 micron biocarbon at concentrations of 2 and 4% by weight. And finally, carbon black was compared with a sample containing by 0.5% by weight of an impact modifier (Engage8965) and biocarbon 4% by weight.

As shown in FIG. 4, the test demonstrates that particles of less than 20 micron of biocarbon either with 2 or 4% by weight can give a darker tint than samples made with carbon black N762 which has a higher surface area compared with the biocarbon or to carbon black Raven 410.

Example 6

Table 6a and 6b show the effect of various processing agents on the properties of doped materials. In this example, pyrolyzed material was milled and sieved using a 63 micron screen. Additives were processed with the maser batch (Table 6a). The master batch was used to deliver a final biocarbon content of 3 wt %. The respective results are shown in Table 6b. Master batches of biocarbon and High Density Polyethylene (HDPE) DMDA in ratios shown in Table 6(a) were manufactured. Composition: Biocarbon source; *miscanthus* with particle size of less than 63 micron, resin HDPE DMDA 8965, and a combination of 1 or more additives. Additives: calcium stearate, phenolic antioxidants (Irganox 245 from Ciba, maleic grafted coupling agents (maleic grafted polyethylene), and/or surfactants (Lankem AP35A and PPD01).

TABLE 6(a)

| | Biocarbon 63 μm > X Wt % | HDPE wt % | Calcium stearate phr | Phenolic antioxidant phr | Maleated polyethylene phr | Surfactant 1 (phr) | Surfactant 2 (phr) |
|---|---|---|---|---|---|---|---|
| HDPE | 0 | 100 | 0 | 0 | 0 | 0 | 0 |
| 1 | 40 | 60 | 0 | 0 | 0 | 0 | 0 |
| 2 | 40 | 60 | 1 | 0 | 0 | 0 | 0 |
| 3 | 40 | 60 | 0 | 1 | 0 | 0 | 0 |
| 4 | 40 | 60 | 0 | 0 | 1 | 0 | 0 |
| 5 | 40 | 60 | 0.5 | 0.5 | 0 | 0 | 0 |
| 6 | 40 | 60 | 0.5 | 0 | 0.5 | 0 | 0 |
| 7 | 40 | 60 | 0 | 0.5 | 0.5 | 0 | 0 |
| 8 | 40 | 60 | 0.5 | 0.5 | 0.5 | 0 | 0 |
| 9 | 40 | 60 | 0 | 0 | 0 | 1 | 0 |
| 10 | 40 | 60 | 0 | 0 | 0 | 0 | 1 |

Mechanical properties of HDPE injection molded samples with a final load of biocarbon of 3 wt % using a master batch prepared as shown in Table 6(b).

TABLE 6(b)

| Sample | A | B | C | D | E | F | G |
|---|---|---|---|---|---|---|---|
| HDPE | 25 ± 0.7 | 1510 ± 56 | 6.5 ± 0.2 | 29 ± 0.3 | 1071 ± 22 | 26 ± 1 | 0.946 ± 0.001 |
| 1 | 24 ± 1.5 | 1480 ± 100 | 5.6 ± 0.04 | 32 ± 0.2 | 1186 ± 13 | 22 ± 1 | 0.950 ± 0.001 |
| 2 | 28 ± 0.8 | 1700 ± 37 | 5.6 ± 0.03 | 31 ± 0.5 | 1163 ± 11 | 23 ± 1 | 0.951 ± 0.001 |
| 3 | 28 ± 0.9 | 1730 ± 30 | 5.6 ± 0.05 | 32 ± 0.3 | 1218 ± 14 | 25 ± 1 | 0.953 ± 0.001 |
| 4 | 28 ± 0.8 | 1740 ± 42 | 5.6 ± 0.07 | 31 ± 0.5 | 1163 ± 11 | 22 ± 1 | 0.950 |
| 5 | 28 ± 0.9 | 1800 ± 27 | 5.7 ± 0.07 | 31 ± 0.4 | 1174 ± 11 | 23 ± 1 | 0.950 |
| 6 | 28 ± 0.9 | 1700 ± 33 | 5.8 ± 0.03 | 31 ± 0.4 | 1173 ± 11 | 26 ± 1 | 0.950 |
| 7 | 27 ± 0.8 | 1680 ± 40 | 5.7 ± 0.05 | 32 ± 0.4 | 1195 ± 15 | 25 ± 1 | 0.950 |
| 8 | 27 ± 0.9 | 1700 ± 30 | 5.6 ± 0.06 | 31 ± 0.4 | 1174 ± 11 | 25 ± 1 | 0.951 |
| 9 | 27 ± 0.9 | 1650 ± 46 | 5.7 ± 0.05 | 30 ± 0.2 | 1143 ± 13 | 23 ± 1 | 0.950 |
| 10 | 28 ± 0.8 | 1700 ± 38 | 5.7 ± 0.04 | 31 ± 0.2 | 1161 ± 10 | 24 ± 1 | 0.950 |

Table 4 references:
"A" = Ten at yield (MPa),
"B" = Tensile Mod (MPa),
"C" = % Elongation at break,
"D" = Flexural Stress (MPa),
"E" = Flexural Modulus (MPa),
"F" = Notched Izod Impact Energy (J/m),
"G" = Density g/cm$^3$.

The above disclosure generally describes the present invention. Changes in form and substitution of equivalents are contemplated as circumstances may suggest or render expedient. Although specific terms have been employed herein, such terms are intended in a descriptive sense and not for purposes of limitation. Other variations and modifications of the invention are possible. As such modifications or variations are believed to be within the sphere and scope of the invention as defined by the claims appended hereto.

What is claimed is:

1. A master batch for the production of composites, the master batch comprising a blend of carbonized biomass and a carrier resin, wherein the carbonized biomass has a particle size lower than about 100 microns, and wherein the concentration of the carbonized biomass in the master batch is from about 25% wt. to about 75% wt., and the concentration of the carrier resin in the master batch is from about 25% wt. to about 75% wt.

2. The master batch of claim 1, wherein the biomass is selected from: plant fibers, municipal solid waste, agricultural biomass, forest biomass, and animal manure.

3. The master batch of claim 1, wherein the carrier resin is a synthetic polymer.

4. The master batch of claim 2, wherein the synthetic polymer is selected from polyethylene (PE), crosslinked-polyethylene (PEX), polypropylene (PP), impact polypropylene, and polybutylene (PB); polyvinylchloride (PVC), chlorinated polyvinyl chloride (CPVC), polyvinylidene fluoride (PVDF), polystyrene (PS), acrylic polymers, nylon, acrylonitrile butadiene styrene, thermoplastic polyurethanes, polycarbonates, or combinations thereof.

5. The master batch of claim 1, wherein the carrier resin is a bioplastic.

6. The master batch of claim 5, wherein the bioplastic is selected from poly(lactic acid) (PLA), polyglycolic acid (PGA), poly(lactic acid-co-glycolic acid) (PLGA), polycaprolactone, polyhydroxyalkanoates or combinations thereof.

7. The master batch of claim 1, wherein the blend further comprises an additive.

8. A composite comprising a polymer compounded with a master batch of claim 1.

9. The composite of claim 8, wherein the concentration of the carbonized biomass in the composite comprises between 1% wt. and 6% wt.

10. A product comprising the composite of claim 8.

11. The master batch of claim 1, wherein the carbonized biomass is biochar.

12. The master batch of claim 1, wherein the carbonized biomass has a particle size ranging from about 50 nanometers to about 100 microns.

13. The composite of claim 8, wherein the carbonized biomass is biochar.

14. The composite of claim 8, wherein the carbonized biomass has a particle size ranging from about 50 nanometers to about 100 microns.

15. A master batch for the production of composites, the master batch comprising a blend of carbonized biomass and a carrier resin, wherein the carbonized biomass has a particle size lower than about 100 microns, and wherein the carrier resin is a bioplastic.

16. A composite comprising a polymer compounded with a master batch of claim 15.

17. A method of producing a master batch according to claim 1, the method comprising: (a) pyrolizing processed biomass in an oxygen-starved environment to produced biocarbon; (b) communiting the biocarbon; (c) mixing the communited biocarbon with a carrier resin, thereby producing the master batch.

18. The method of claim 17, wherein the pyrolysis is carried out at a temperature of about 400° C. to about 900° C.

19. The method of claim 18, wherein the biocarbon is comminuted while the biocarbon is at about 350° C.

20. The method of claim 17, wherein the comminuting of step (b) takes place in a reduced oxygen atmosphere.

21. The method of claim 20, wherein the method further comprises cooling the comminuted biocarbon.

22. The method of claim 21, wherein the comminuted biocarbon is cooled to about 200° C.

23. The method of claim 17, wherein the biocarbon is comminuted to a particle size ranging from about 100 microns to about 50 nanometers.

24. The method of claim 17, wherein from about 25% wt. to about 70% wt of the carrier resin is mixed with from about 30% wt. to about 75% wt. of the biocarbon.

25. The method of claim 17, wherein the method further comprises adding an additive.

* * * * *